Oct. 9, 1928.  
G. L. BAUGHMAN  
DIRECTION INDICATOR  
Filed April 10, 1928

G. L. Baughman INVENTOR

BY *Victor J. Evans* ATTORNEY

WITNESS:

Oct. 9, 1928.
G. L. BAUGHMAN
DIRECTION INDICATOR
Filed April 10, 1928
1,687,421
3 Sheets-Sheet 2
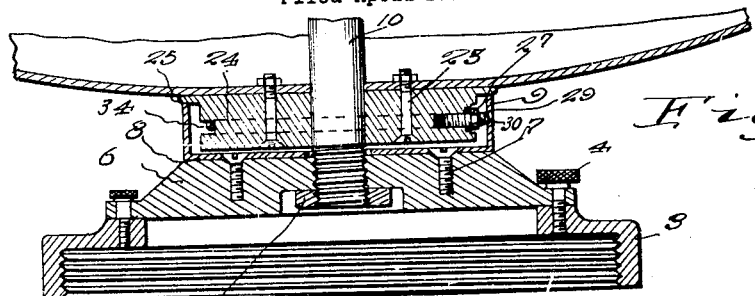
Fig.4.
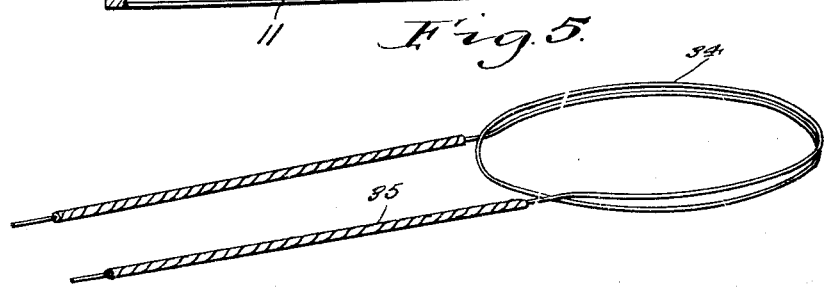
Fig.5.
Fig.6.
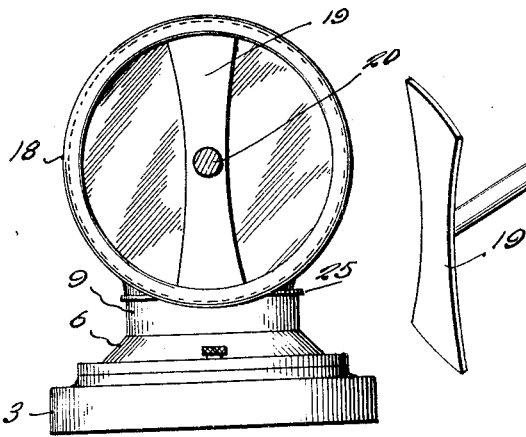
Fig.8.
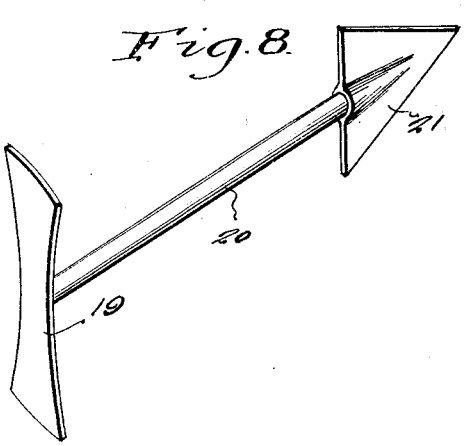
Fig.7.
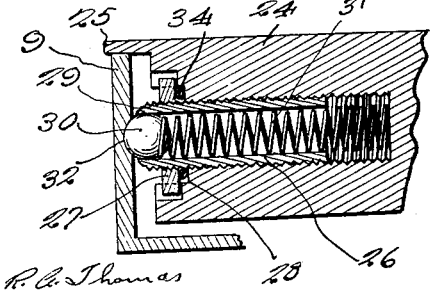
G. L. Baughman INVENTOR
BY Victor J. Evans ATTORNEY
WITNESS:

Oct. 9, 1928.

G. L. BAUGHMAN 1,687,421

DIRECTION INDICATOR

Filed April 10, 1928

G. L. Baughman, INVENTOR

BY Victor J. Evans
ATTORNEY

WITNESS:
R. A. Thomas

Patented Oct. 9, 1928.

1,687,421

UNITED STATES PATENT OFFICE.

GUY LESTER BAUGHMAN, OF BURBANK, OKLAHOMA.

DIRECTION INDICATOR.

Application filed April 10, 1928. Serial No. 268,838.

My present invention has reference to a direction signal for automobiles or like vehicles, and my primary object is to mount on the forward portion of the vehicle, preferably on the filler spout for the radiator, a lamp housing having an arrow extending centrally therefrom, said arrow having on its inner end a plate that is arranged against the lens of the lamp housing and held thereto whereby the rays of light from the lamp in the house will be directed along both sides of the arrow, together with simple means arranged on the instrument board of the machine for turning the signal to indicate the direction of travel to be taken by the machine, together with means for latching the signal in any of its signaling positions and whereby traffic ahead or at the sides of the vehicle will have ample warning as to the intention of the driver and accidents, commonly caused by the lack of such knowledge will be prevented.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 4 is an enlarged sectional view through the base portion of the improvement.

Figure 5 is a perspective view showing the looped end of the actuating cable.

Figure 6 is a sectional view approximately on the line 6—6 of Figure 2.

Figure 7 is an enlarged detail sectional view approximately on the line 7—7 of Figure 3.

Figure 8 is a perspective view of the headed portion of the arrow signal.

Figure 1:
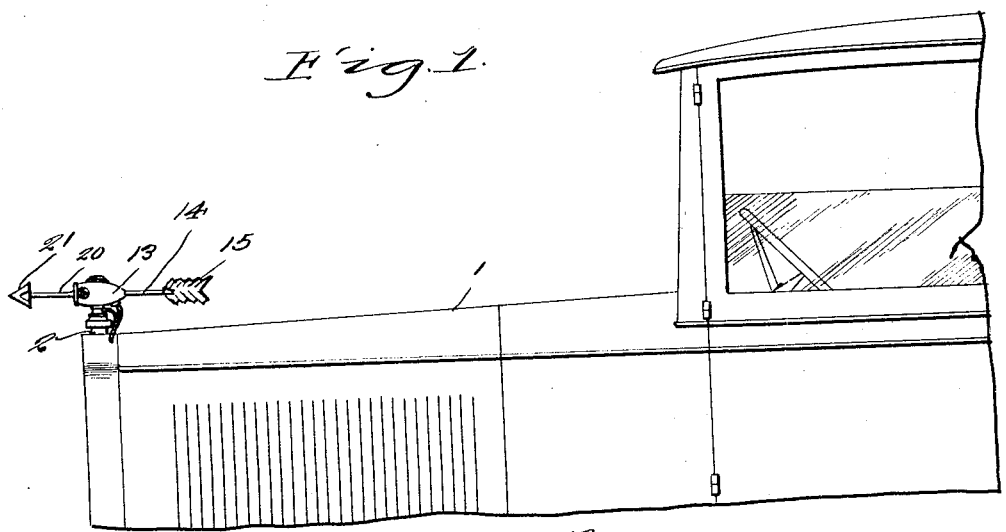
Figure 1 is a side elevation of a sufficient portion of an automobile to illustrate the application of my improvement thereon.
Figure 2:
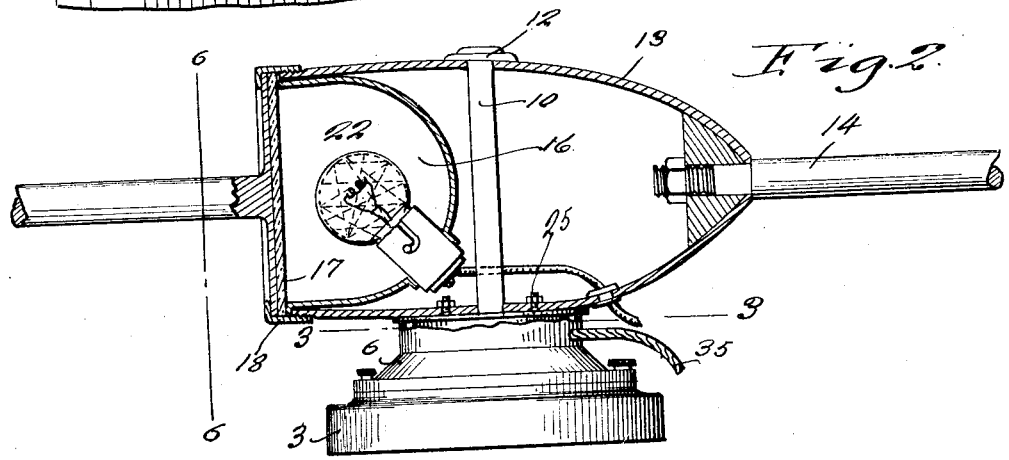
Figure 2 is a side elevation of the improvement, parts being in section.
Figure 3:
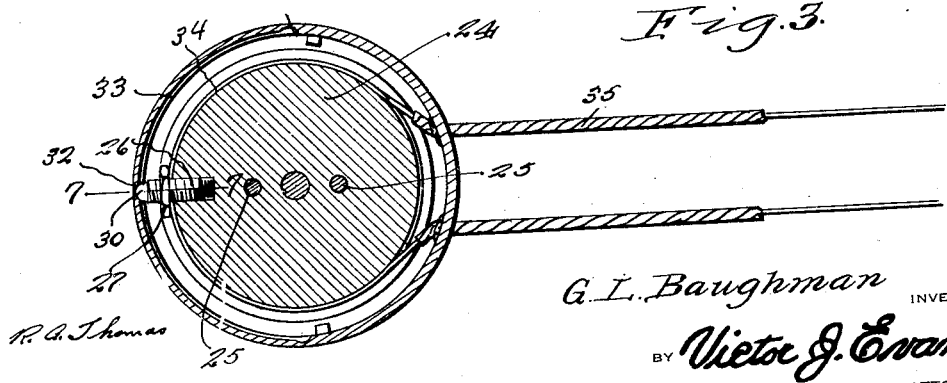
Figure 3 is a sectional view approximately on the line 3—3 of Figure 2.
Figure 9:
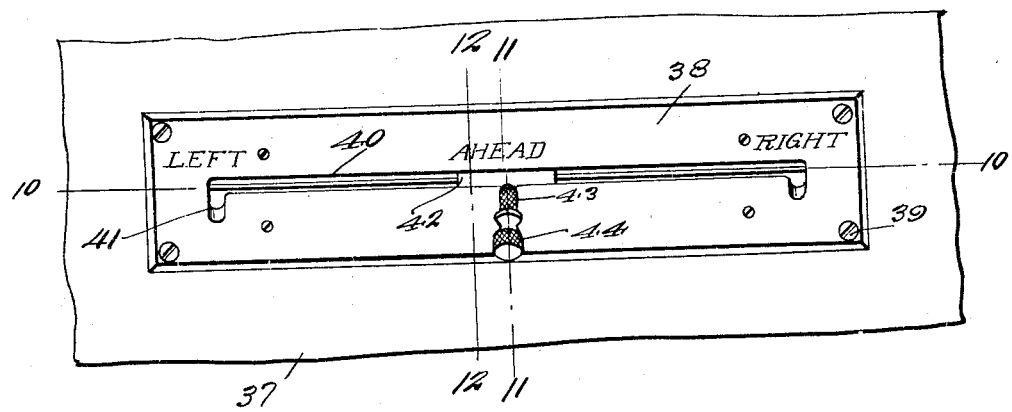
Figure 9 is a face view of the throw or operating mechanism which is attached to the dash of the automobile.
Figure 10:
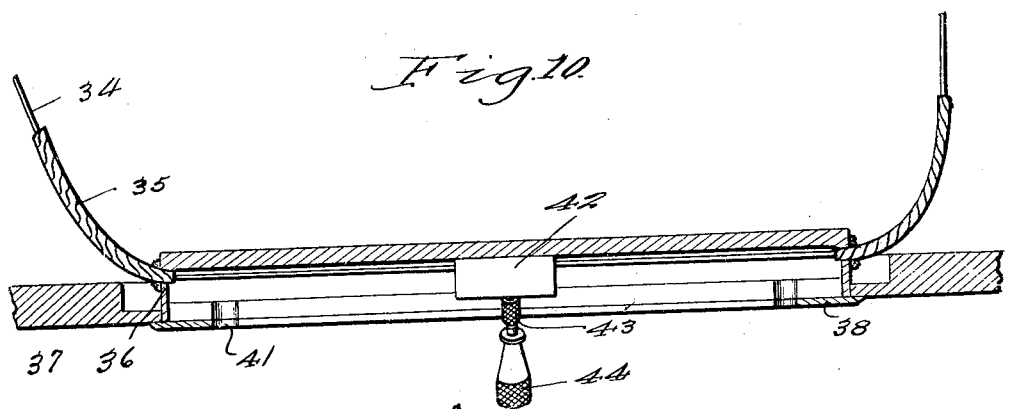
Figure 10 is a sectional view approximately on the line 10—10 of Figure 9.
Figures 11, 12:
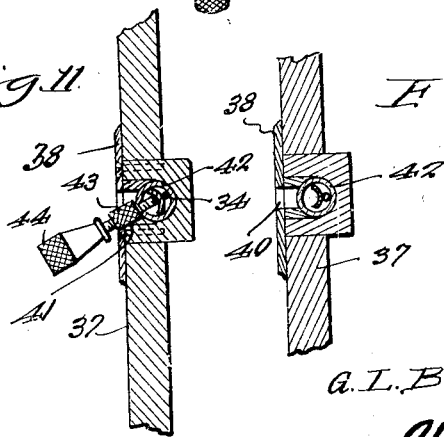
Figure 11 is a sectional view approximately on the line 11—11 of Figure 9.
Figure 12 is a sectional view approximately on the line 12—12 of Figure 9.

At present most automobiles or like motor propelled vehicles equipped with a stop or signal lamp arranged on the rear thereof, are automatically lighted by the depression of the foot brake pedal. This is amply sufficient to warn traffic in the rear of the machine to prevent rear-end damage thereto. Other automobiles have been equipped with stop or indicating signals in the nature of arms that are swung vertically to different angles. These signals are only observable from the front and rear of the vehicle and do not safeguard the automobile from traffic moving rightangularly with respect thereto.

My improvement is designed to warn traffic both ahead and at the sides of the automobile equipped therewith, the device being highly ornamental so as to add to the appearance of the car and being easily and accurately operated by one hand of the driver without necessitating the removal of a second hand from the steering wheel, the operation being quick and almost instantaneous.

If desired my improvement may be attached directly to the cap for the filler spout of the automobile; may be attached to a supplemental cap, and the pivot therefor may be in the nature of the stem of a motor meter.

Referring now to the drawings in detail, the numeral 1 designates the forward portion of an automobile and 2 the filler spout for the radiator thereof. In the illustrated embodiment of my improvement I screw on the spout 2 a flanged cap 3, which, as stated, may be the ordinary cap for this purpose. On the top of the cap 3 I secure by removable elements, such as headed bolts 4, the base plate 6 of the improvement. The base is in the nature of a comparatively thick disc beveled from its upper to a point adjacent its lower edge, and the flat top of the base has removably secured thereon, by means 7, the flat bottom 8 of an annulus or ring member 9.

There is passed centrally through the bottom 8 of the ring member 9, and screwed through the base 6 a pivot post or bolt 10. The lower and threaded end of this bolt is engaged by a nut 11 which is received in the pocket in the under face of the base 6. As stated, the pivot bolt or post may be in the nature of the stem of a motor meter but in the showing of the drawings, the bolt has an outer headed end 12. The bolt passes through bearing openings approximately in the center and in the top and bottom walls of a lamp house 13 and the head of the pivot bolt contacts with the upper or outer face of the said lamp house. The lamp house is comparatively small and while round in cross section has its rear end substantially cone-shaped. Removably secured in the said rear end of the lamp house 13 there is the stem portion 14 of a tail 15 of the arrow that comprises an important element of the signal. Arranged in the open end of the lamp house there is a globular reflector 16 that is contacted by the lens 17, and the said lens is held in place by the usual flanged ring cap 18. In the present instance the ring cap or nut 18 holds against the center of the lens the vertically arranged web or plate 19 formed on the inner end of the stem 20 of an arrow head 21. In the reflector 16 there is fixed the base of a lamp bulb 22. The conductors for this lamp bulb are suitably encased and are, of course, connected to a source of electricity controlled by a switch and this switch may be operated by the throw mechanism of the improvement which will hereinafter be described.

As far as the description has progressed it will be noted that the rays of light from the bulb 22 pass through the lens 17 at the opposite sides of the plate or web 19 of the signal arrow and, therefore, such rays of light will be directed along each side of the signal arrow.

Fixed on the bottom of the lamp house by removable means 23 and received in the ring member or housing 9 there is a grooved wheel or drum 24. The drum preferably has its upper edge formed with an outwardly directed flange 25 that rests directly upon the outer edge of the ring member or housing 9, but obviously anti-frictional elements may be arranged between the grooved wheel or drum 24 and the ring or housing 9.

There is screwed through the periphery of the drum a tube 26, the said tube having screwed thereon a binding nut 27 which is received in a depression or pocket in the drum 24 and which likewise contacts with a spring washer 28 which holds the nut from turning. The outer end of the tube 26 is slightly rounded inwardly or toward the bore thereof, providing what I will term a lip 29 that is designed to be contacted by a sphere 30 that is influenced against the lip through the medium of a coiled spring 31 that is arranged in the tube 26. The ball or sphere is designed to be received in any one of the three spaced depressions or concavities 32 on the inner wall of the ring or housing 9, one of the said depressions being disposed in a line with the center at the front of the ring or housing and the others being arranged at points oppoiste the axial center of the said housing. The housing, between the pockets or depressions 32, may and preferably is grooved, as at 33.

There is arranged in the groove of the drum 24 the central looped portion 34 of the actuating cable of the improvement. The cable has its leads guided through flexible tubes 35, the said tubes being directed through the top of the radiator casing, and from thence under the hood of the automobile 1 through the dash board and into the ends of a substantially rectangular casing 36 which is let through the instrument board 37 of the automobile. The outer or face plate 38 of the casing 36 extends beyond the casing proper and is provided with openings for attaching screws 39. The plate 38 is centrally formed with a longitudinally extending elongated opening 40, and the said plate has depending slots or passages 41 arranged at the center and in a line with the end walls provided by the opening 40, the said slots or passages communicating with the lower wall provided by the said opening 40. Suitably guided in the casing 36 there is a block in the nature of a slide 42. This slide has a centrally arranged outstanding stem portion 43 to which there is attached a handle 44, and to the respective ends of the slide 42 there is secured the ends of the leads of the actuating cable.

When the handle 44 is moved to bring the stem 43 into the central notch 41 the signal will be arranged in a straight line with respect to the longitudinal plane of the automobile. When the handle is moved to bring the stem out of the central notch and is actuated to move the slide 42, say to the right of the casing 36 and then swung to bring its stem into the notch 41 at this end of the housing the signal will be moved so that the arrow head thereon will point to the right hand side of the machine, indicating to traffic that the driver is to take a right hand turn. When in both of the aforementioned portions the latching means provided by the ball or sphere and the depressions therefor will be in active or latching positions so that the signals cannot be accidentally turned. Obviously when the handle is operated to move the slide to the left hand side of the casing 36 and swung to bring the stem 43 into the notch at this side of the casing, the signal will be turned to arrange the arrow to point to the left hand side of the automobile and the latch will be automatically operated to lock the signal in this position.

Having described the invention, I claim:—

1. The combination of an automobile, of a direction signal arranged on the cap of the filler spout for the radiator thereof, and including a base having an upstanding ring flange, a headed pivot post removably secured to the base, and extending upwardly therefrom, a lamp house mounted on the pivot post, a drum on the under face of the lamp house received in the ring flange, a semaphore including a tail portion which is secured to the rear of the lamp house, and a front portion having an angle plate on the inner end thereof arranged vertically against the lens of the lamp house and secured thereto, a lamp in the lamp house for directing light through the lens along the opposite sides of the plate, an actuating cable having a coiled portion wound around the drum, flexible guides for the leads of the cable, directed into the automobile, a casing fixed in the instrument board of the automobile to which the ends of the guides are secured, said casings having its face plate formed with a longitudinal slot and having depending central and end passages communicating with said slot, a slide in the casing to which the ends of the flexible element are secured, a shank on the slide movable through the slot and into any of the passages which communicate with the slot, a handle on the shank, in combination with means for latching the drum in the ring flange or holding the signal from movement when the same is turned to any of its signaling positions.

2. The combination of an automobile, of a direction signal arranged on the cap of the filler spout for the radiator thereof, and including a base having an upstanding ring flange, a headed pivot post removably secured to the base, and extending upwardly therefrom, a lamp house mounted on the pivot post, a drum on the under face of the lamp house received in the ring flange, a semaphore including a tail portion which is secured to the rear of the lamp house, and a front portion having an angle plate on the inner end thereof arranged vertically against the lens of the lamp house and secured thereto, a lamp in the lamp house for directing light through the lens along the opposite sides of the plate, an actuating cable having a coiled portion wound around the drum, flexible guides for the leads of the cable, directed into the automobile, a casing fixed in the instrument board of the automobile to which the ends of the guides are secured, said casing having its face plate formed with a longitudinal slot and having depending central and end passages communicating with said slot, a slide in the casing to which the ends of the flexible element is secured, a shank on the slide movable through the slot and into any of the passages which communicate with the slot, a handle on the shank, a spring influenced sphere, a tubular casing therefor let in the drum, and holding the sphere from outward movement therethrough, said ring flange having a central depression and right angular depressions, any of which are designed to receive the sphere therein, and said ring flange having a groove communicating with the said depressions.

In testimony whereof I affix my signature.

GUY LESTER BAUGHMAN.